Dec. 16, 1969   J. L. WEEKLEY   3,484,075
VALVE STRUCTURE

Filed May 3, 1967   2 Sheets-Sheet 1

INVENTOR.
JACK L. WEEKLEY
BY Hood Gust & Irish
attorneys

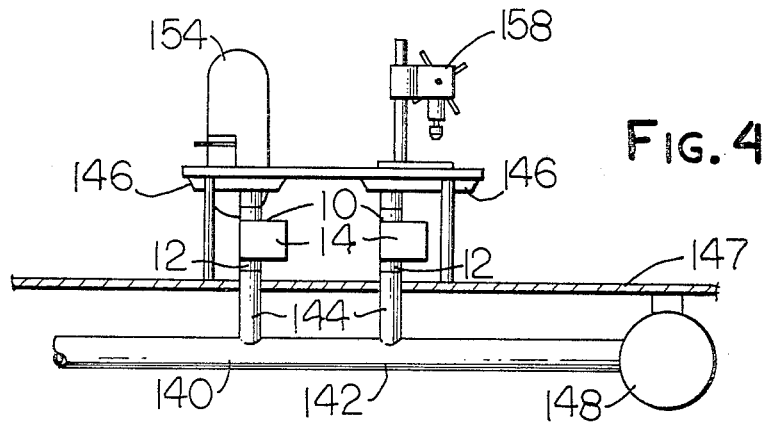
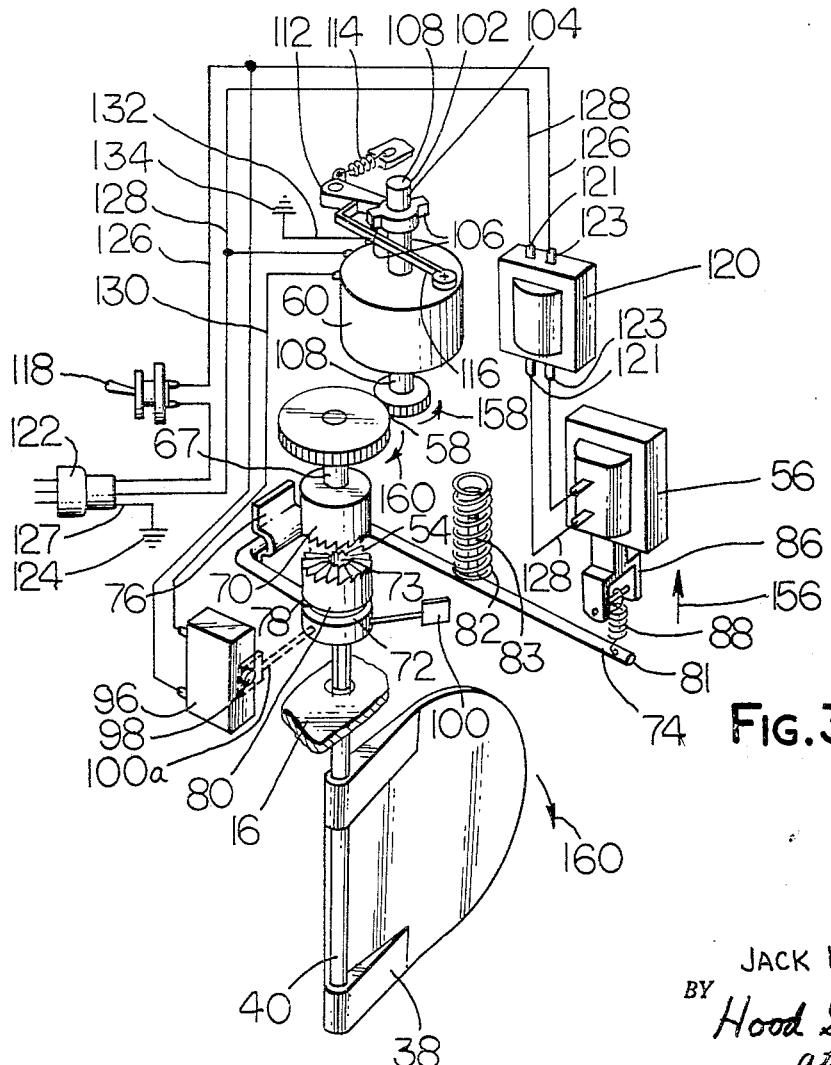

United States Patent Office 3,484,075
Patented Dec. 16, 1969

3,484,075,
VALVE STRUCTURE
Jack L. Weekley, R.R. 5, Wabash, Ind. 46992
Filed May 3, 1967, Ser. No. 635,740
Int. Cl. F16k 31/04, 15/03
U.S. Cl. 251—134                                6 Claims

ABSTRACT OF THE DISCLOSURE

A valve structure for a suction system for use with wood-working machines having cutting apparatus which produces shavings, small particles, dust or the like. The valve structure opens the valve simultaneously with the machine being turned on, holds the valve in the open position while the machine is being used, and closes the valve either simultaneously with or subsequently to the machine being turned off. The valve structure includes a conduit having an inlet which is positioned adjacent to the cutting apparatus of the machine such that the waste shavings, particles, dust, and the like are sucked into the conduit. The valve is opened by a non-reversible motor, held in an open position by a brake and clutch mechanism, closed by releasing the clutch mechanism allowing the valve to move into a closed position in accordance with the suction of the system, and held in a closed position by the suction of the system.

---

The present invention generally relates to a valve structure, and more specifically, to an improved valve structure for use in a vacuum or suction system. Suction systems have heretofore been provided for wood-working shops. Such systems generally comprise a duct network connected to a blower. The duct network is provided with an inlet opening adjacent to each of the machines located in the shop to suck the small waste particles, dust, shavings and the like created by the operation of the machines into the ducts. The valve structure of this invention is especially suited for use with such systems.

Most prior art suction systems of the type above-mentioned are provided with manually operated valves adjacent to each inlet of the duct network. The blower of such suction systems is usually provided in a size which produces the desired suction in the duct network with the maximum number of valves, which may be open at one time. For example, if a common duct network were used for two separate but adjacent shops, and these shops were never used simultaneously, conventionally, the blower is provided in a size which would be sufficient for the larger of the two shops. Since increased blower capacity is relatively expensive, such arrangements are not uncommon. However, for such an arrangement to be desirable, each of the valves must be closed when not in use. Otherwise, the suction of the system would be depleted, due to the open valves, and sufficient suction would not be available when required. Since the prior art valves above-mentioned are manually operated, each machine operator must remember to open and close the valve prior to and subsequent to the operation of the machine to maintain the system operable.

Manual valves are used in prior art suction devices for wood-working shops primarily because of the relatively inexpensive procurement and maintenance cost thereof. Therefore, any valve designed to replace such valves should also be relatively inexpensive. Desirably, such valves should be constructed of relatively standard pieces and parts, and in a manner to be simple in construction and operation.

One disadvantage of the manual valves of the type used with prior art suction systems is that they tend to leak even when closed. Partially causing this leakage are the built-in loose tolerances of such valves which render the valves easily operable even when clogged with dust, shavings and the like. Several of these valves, all leaking, not only depletes the suction of the system, but can make sufficient noise to be disturbing and to prevent any conversation from being carried on in the shop. Thus, it is desirable to provide a valve which will not leak when closed, and which will still be easily operable.

Further, to insure that each of the valves is appropriately opened and closed during the operation of the machine it is highly desirable to provide that the valve be connected to the machine itself such that when the machine is turned on or off, the valve is respectively, opened and closed. This relieves the machine operator from opening and closing the valve and insures that each valve is closed when not in use. Since the suction system is preferably left on for a short period after the machine is turned off for the purpose of clearing the debris from the machine after operation, a delay mechanism is desirable when the valve is operated by the off-on switch of the machine.

For these reasons, it is highly desirable to provide an improved mechanized valve for suction systems such as those used in wood-working shops which can be provided and maintained relatively inexpensively, is simple in both construction and operation, does not leak when closed, and is operable by the on-off switch of the machine with which the valve is associated.

The primary object of this invention is to provide an improved valve structure for use with suction systems of the type used in wood-working shops.

Another object of this invention is to provide an improved motor-operated valve structure which is both simple in structure and relatively inexpensive to manufacture and maintain in operation.

Yet another object of this invention is to provide an improved valve structure for use with a suction system in a wood-working shop in combination with cutting machines such as drill presses, sanders, planers, saws and the like which form waste dust, shavings, and other debris which automatically opens and closes, respectively, with the starting and stopping of the operation of the machine.

Still further an object of this invention is to provide an improved valve structure for use with suction systems in wood-working shops in combination with machines of the type which create dust, shavings and other waste debris during their operation, the valve being simple in both construction and operation and relatively inexpensive to manufacture and maintain.

In the broader aspects of this invention, there is provided a valve structure for a suction system comprising a frame with a conduit secured to the frame. The conduit has a peripheral valve seat therein separating a high pressure conduit portion and a low pressure conduit portion. The valve seat has a face directed toward the high pressure portion of the conduit. A valve is mounted for swinging movement in the high-pressure conduit portion to be movable between a closed position in which the valve is peripherally engaged to the valve seat and an open position. The valve is secured to an actuating shaft which is connected to a motor-driven shaft by a suitable clutch mechanism. Means is provided for selectively engaging and disengaging the clutch and for selectively starting and stopping the motor.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
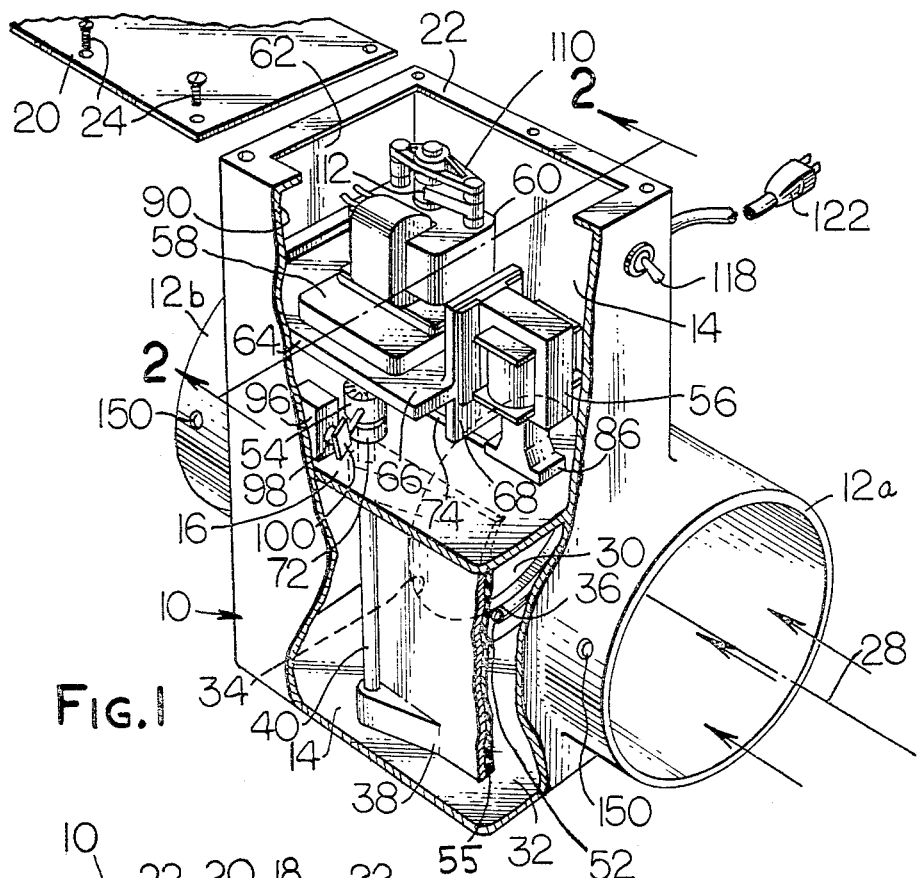
FIG. 1 is a perspective view of the valve structure of this invention with the cover removed from the housing and the housing partially broken away.

FIG. 3 is a perspective and partially diagrammatic view of the pieces and parts of the improved valve system of this invention disassembled from the housing of the structure; and FIG. 4 is a fragmentary view, partially in cross-section, of a typical suction system installed in a woodworking shop showing the blower and ducts of the system and the improved valve of this invention mounted in relation to the ducts and the machines with which the suction system is used.

Referring to the drawings, the valve structure of this invention is shown to have a housing or frame 10. Housing 10 has a conduit portion 12 and a chamber portion 14. Conduit portion 12 and chamber portion 14 are separated from each other by a dust-tight partition 16. Chamber portion 14 has an opening 18 in one end thereof; opening 18 is closed by a cover 20 which is secured to a peripheral lip 22 surrounding the opening 18 by means of a plurality of screws 24.

The conduit portion 12 has two spaced apart conduit sections 12a and 12b positioned on a common axis 28 and a partition 26 therein which extends generally perpendicularly of the partition 16 and axis 28. Partition 26 divides the conduit portion 12 into a low-pressure portion 30 and a high-pressure portion 32. Conduit sections 12a and 12b communicate with portions 32 and 30, respectively. Partition 26 has an opening 34 therein the center of which is positioned on the axis 28. Opening 34 has a size slightly less than the size of the interior dimension of the conduit portion 12. Peripherally surrounding the opening 34 is a valve seat 36 which faces the high-pressure portion 32.

Mounted within the high-pressure portion 32 is a valve 38. Valve 38 is secured to a valve actuating shaft 40 which is mounted for rotation within the high-pressure portion 32. Shaft 40 extends through an opening 42 in the partition 16 which is fitted with a suitable bearing 44. Bearing 44 seals the shaft 40 to the opening 42 in a manner to prevent the leakage of fine particles, dust and the like through the opening 42. Shaft 40 extends generally parallel to the partition 26 and through an opening 46 in the wall 48 of the conduit portion 12 which is opposite and generally parallel to the partition 16. A suitable bearing 50 is provided in the opening 46 to receive the shaft 40. Thus mounted, the valve 38 is movable between a closed position in which the valve is engaged peripherally by the valve seat 36 (see FIG. 2) and an open position in which the valve 38 extends generally perpendicularly to the partition 26 and parallel to the axis 28 (see FIG. 1).

In a preferred embodiment, an O-ring 52 is secured to the valve seat 36 and the valve 38 has a surface 55 of resilient, rubber-like material, which when the valve 38 is closed engages the O-ring 52. These provisions provide that when the valve 38 engages the valve seat 36, the O-ring 52 will deform so as to seal the valve 38 to the valve seat 36 and prevent leakage between the high-pressure and low-pressure portions 30, 32 of the conduit 12.

Mounted within the chamber portion 14 of the housing or frame 10 is a mechanism for moving the valve 38 between the open and closed positions afore-described. This mechanism comprises generally a clutch 54, a clutch actuating solenoid 56, a gear reduction mechanism 58, and a motor 60.

Secured to an interior wall 62 of the chamber portion 14 of the housing or frame 10, is a frame member 64 having a body 66 and an end piece 68. Member 64 projects from the wall 62 so as to suspend the body 66 in a position generally parallel with the partition 16.

Figure 2:
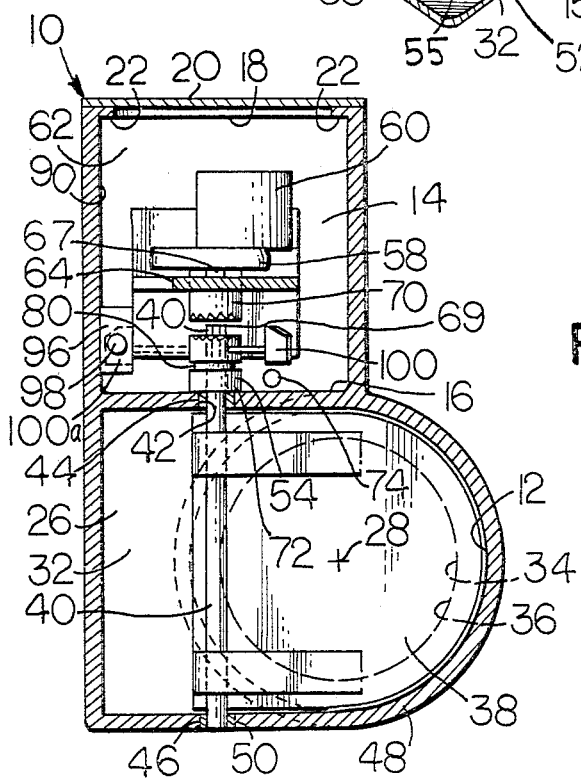
FIG. 2 is a cross-sectional view of the structure illustrated in FIG. 1 taken substantially along the section line 2—2.

Mounted on the body 66 is the motor 60 and gear reduction mechanism 58. The gear reduction mechanism 58 is mounted on the body 66 and has a shaft 67 which passes through an opening (not shown) in the member 64. Clutch 54 consists of two portions 70 and 72. Portion 70 is positioned coaxially on shaft 67 and secured thereto. Portion 70 extends downwardly through the opening in the member 64 and beneath the member 64 as shown in FIG. 2. The motor 60 is mounted to the gear reduction mechanism 58; the gear reduction mechanism 58 separates the motor 60 from the member 64, and is operatively connected to the motor shaft 108 of the motor 60.

Both the driven shaft 67 of the gear reduction mechanism 58 and the clutch portion 70 are positioned on the same axis as the shaft 40. However, both the shaft 67 and the clutch portion 70 are spaced apart from the end 69 of the shaft 40 located within the chamber portion 14 of the housing 10.

Clutch portion 72 is coaxially positioned on shaft 40 adjacent to end 69 thereof and within chamber portion 14 of the housing 10. Both the portion of shaft 40 within the chamber 14 and the opening 73 of the clutch portion 72 in which the shaft 40 is positioned have a hexagonal cross-sectional shape. The opening 73 has a size slightly larger than the size of the shaft 40 allowing the clutch portion 72 to axially slide on the shaft 40. However, the mating of the exterior surface of the shaft 40 with the interior surface of the opening 73 prevents the clutch portion 72 from rotating about the shaft 40 independently thereof.

Clutch 54 further comprises a clutch actuating rod 74 which is operatively connected to the solenoid 56 for selectively engaging and disengaging the clutch. Rod 74 is swingably mounted to the wall 62 of the chamber portion 14 of the housing 10 by a bracket 76. Rod 74 extends from the bracket 76 toward the clutch portion 72 and terminates at end 78. Clutch portion 72 is provided with an annular groove 80 which is coaxial of shaft 40, and end 78 of the rod 74 is positioned therein. End 78 engages the sides of the groove 80 such that when the end 78 moves in a direction axially of the rod 40, its motion will be imparted to the clutch portion 72 to cause the portion 72 to move toward and away from portion 70.

Rod 74 also extends from the bracket 76 toward the solenoid 56 and terminates at end 81. Solenoid 56 is mounted on end piece 68 of the member 64. End 81 of the rod 74 is connected to the armature 86 of the solenoid 56 by means of a spring 88. Intermediate the bracket 76 and end 81, there is connected to the rod 74 and to the member 64 a spring 82. Spring 82 is secured to the member 64 and depends from the member 64 toward the rod 74. The rod 74 is provided with a guide rod 83 which extends coaxially of the spring 82 to position the spring 82 between the rod 74 and the member 64.

Secured to the interior wall 90 of the chamber portion 14 of the housing 10 is a micro-switch 96 which is normally closed. Switch 96 has a button 98 positioned adjacent the clutch portion 72 which when depressed opens the switch. An arm 100 is secured to the clutch portion 72 to extend radially outwardly therefrom. Arm 100 is rotated with the clutch portion 72 and is positioned relative thereto such that the arm 100 depresses the button 98 of the switch 96 when the clutch portion 72 is rotated into a position corresponding to an open position of the valve 38. This position of the arm 100 is shown in dashed lines and indicated by the reference numeral 100a in FIGS. 2 and 3.

Positioned on the motor 60 is a brake mechanism 102. Brake mechanism 102 comprises a rotary member 104 having oppositely disposed ears 106 integrally molded thereto. Rotary member 104 is secured to the motor shaft 108 adjacent to end bearing 110 of the motor 60. Pivotally connected to one of two mountings of the end bearing 110 is a pin 112 which is moved into engagement with the ears 106 of the rotary member 104 by means of a spring 114. Pin 112 is moved out of engagement with the ears 106 of the rotary member 104 by means of a lever 116 which is pivotally connected to the other mounting of the end bearing 110. Lever 116 has a portion thereof which is positioned adjacent to the coil of the motor 60. Lever 116 is moved to engage the pin 112 and to move the pin 112 against the urging of the spring 114 by the magnetic field of the coil of the motor 60. The spring 114 moves both the lever 116 and the pin 112 in the opposite direction whenever the coil of the motor 60 is not actuated.

In one embodiment, an off-on switch 118 is secured to the housing 10. In another embodiment, the switch 118 is the off-on switch of the machine with which the valve structure is being used.

In a preferred embodiment, a time delay relay 120 is secured to the housing or frame 10 adjacent to the solenoid 56. The function of this time delay relay 120 will be described hereinafter wherein it will become obvious that while the provision of the relay 120 is preferred, the valve system of this invention can be provided without the same is desired.

Referring now specifically to FIG. 3, the electrical connections between a power source 122 diagrammatically illustrated in FIG. 3 as a plug, and the specific structure above-described will now be described. Starting with the power source 102, leads 126, 127 and 128 extend therefrom. Lead 127 is grounded at 124. Lead 126 extends from the power source 122 to the switch 118 and then from the switch 118 to both one terminal of the switch 96 and one terminal of the solenoid 56. In the preferred embodiment abovementioned which utilizes the relay 120, the relay 120 has two pair of terminals 121 and 123 which are not conductively connected together. In this embodiment, the portion of the conductor 126 which is connected to solenoid 56 is broken and the opposite ends thereof are connected to the terminals 123.

The remaining conductor 128 which extends from the power source 122 is connected to both one terminal of the motor 60 and to the remaining terminal of the solenoid 56. In the preferred embodiment the portion of the conductor 128 extending to the solenoid 56 is broken and the opposite broken ends are connected to the terminals 121, respectively.

The remaining electrical connections of the valve of this invention are provided by connecting the opposite ends of a conductor 130 to the remaining terminal of the switch 96 and another terminal of the motor 60. The motor 60 in the specific embodiment illustrated has a third terminal to which a conductor 132 is connected. The opposite end of conductor 132 is grounded at 134.

In operation, the valve structure of this invention is mounted in operating relation to the suction system of a woodworking shop as illustrated in FIG. 4. Conventionally, such suction systems comprise a duct system 140 comprising a main duct 142 and auxiliary ducts 144 which extend from the main duct 142 to an adaptor 146 which is mounted beneath the work tables of the shop. Adaptors 146 have an inlet opening (not shown) therein which is positioned adjacent to each of the machines which produce the particles, dust, shavings or the like which are desirably disposed of by the suction system. Conventionally, the main duct 140 is located beneath the floor 147 of the shop and is connected directly to a suitable sized blower 148. The valve structures of this invention preferably are mounted in the ducts 144 in a position such that the housing 10 rests on the floor 147. The auxiliary ducts 144 extend through openings in the floor 147 and into the conduit section 12b of the low pressure portion 30 of the conduit portion 12. The conduit section 12a of the high pressure portion 32 of the conduit portion 12 similarly receives therein a portion of an adaptor 146. Both the adaptors 146 and the auxiliary ducts 144 are secured in the respective sections 12a, 12b of the conduit portion 12 by an appropriately positioned set screw 150. Thus installed, the duct network 140 and the conduit portion 12 of the housing 10 of the valve structure provides a continuous duct network between the inlet opening of the adaptors 146 and the blower 148 of the suction system.

The valve structure of this invention is actuated by closing the switch 118. This switch, in a preferred embodiment, is the off-on switch of the machine with which the valve is associated. Whether the switch 118 is mounted to the housing 10 as above-described and illustrated in FIG. 1 or is the off-on switch of a machine such as the band saw 154 or the drill press 158 illustrated in FIG. 4, the valve structure of this invention operates precisely the same. The closure of the switch 118 actuates both the solenoid 56 and the motor 60. The solenoid 56 upon being actuated pulls the armature 86 into the coil thereof and thus moves the rod 74 in the direction of the arrow 156 shown in FIG. 3. This movement compresses the spring 82 and also moves the clutch portion 72 axially of the rod 40 into engagement with the clutch portion 70.

The motor 106 runs in the direction indicated by arrow 158 through the gear reduction mechanism 58 so as to drive the shaft 67 in the direction of the arrow 160. In one embodiment shaft 67 rotates at a speed of about 18 r.p.m. The motion of the shaft 67 is imparted to the shaft 40 and the valve 38 is moved from the closed position illustrated in FIG. 3 in which the valve 38 is peripherally engaged by the valve seat 36 approximately 90° into the open position illustrated in FIG. 1. As the valve 38 is moving from the closed position to the open position, the arm 100 moves from the position illustrated in solid lines in FIGS. 2 and 3 to the position 100a illustrated in dashed lines in FIGS. 2 and 3.

The arm 100 in the position 100a depresses the button 98 of the switch 96 thereby to open the switch 96. The opening of the switch 96 stops the current flow to the motor 60. As soon as this occurs, the magnetic field of the coil of the motor 60 releases the lever arm 116 thereby allowing the spring 114 to move the pin 112 into a position in which it will engage one of the ears 106 of the rotary member 104. The abutment of the pin 112 with one of the ears 106 stops the shaft 108 from further moving; and thus, the valve 38 does not move any further. The opening of the switch 96, however, does not affect the solenoid 56 and thus, the solenoid 56 remains energized such that the clutch portion 72 remains engaged to the clutch portion 70.

The gear reduction mechanism 58 does not allow the shaft 67 to rotate in a direction opposite to the direction of the arrow 160; thus, so long as the clutch 54 is engaged, the valve 38 is held in the open position above-mentioned. So long as the switch 118 remains closed the solenoid 56 remains activated and the valve 38 remains in the open position. The switch 118 remains closed so long as the machine with which the valve structure of this invention is used is operated and the suction of the system is needed to dispose of the particles, dust, shavings and the like produced by the machine during its operation.

Upon completing the use of the machine to which the valve structure of this invention is connected, the switch 118 is opened and the connection between the power source 122 and the solenoid 56 is broken. Upon the deenergization of the solenoid 56, the armature 86 is no longer held by the coil thereof and the spring 82 urges the rod 74 in a direction opposite that of the arrow 156. The urging of the spring 82 thus moves the armature 86 of the solenoid 56 into its extended position and the clutch portion 72 into a spaced apart relation with the clutch portion 70. The movement of the clutch portion 72 disengages the clutch 54 and allows the shaft 40 to rotate independently of the shaft 67 which is held by the gear reduction mechanism 58. The pressure differential between the low pressure portion 30 and the high pressure portion 32 acts upon the valve 38 to move the valve 38 in a direction opposite the arrow 160 from the open position illustrated in FIG. 1 to the closed position illustrated in FIG. 3. The suction within the duct 144 operates to hold the valve 38 against the valve seat 36 in a manner to deform the O-ring 52 and the rubber-like covering 55 of the valve 38 so as to form a seal therebetween. The valve 38 is now closed. Valve 38 can be again opened in the manner above-described whenever the switch 118 is again closed.

In the preferred embodiment in which the off-on switch of the machine with which the valve structure of this invention is used is switch 118, preferably, the time delay relay 120 is incorporated into the device. The operation of the preferred device having a time delay relay 120 is exactly as above described except that the deactuation of the solenoid 56 upon the opening of the switch 118 is delayed a short time. In a specific embodiment, this time period may be about 30 seconds. Thus, the relay 120 serves to keep the valve 38 open for a short time after the machine is shut off thereby allowing all of the waste particles, dust, shavings and the like to be cleared from the machine prior to the closing of the valve 38.

The valve 38 of this invention when closed is tightly sealed against the valve seat 36 whereby no leakage occurs between the high pressure portion 32 and the low pressure portion 30. This provision eliminates noise such as that resulting from the leakage occurring in prior art valves and permits the use of a blower 148 of a smaller size than heretofore possible with such valves. Further, the operation of the valve structure of this invention is unhampered by the waste particles, dust, shavings and the like which may collect within the conduit portion 12 of the housing 10. This result is achieved by locating all of the valve actuating mechanism which could become clogged by such waste material within the closed chamber 14 of the housing or frame 10. The valve structure of this invention is also simple in construction and can be manufactured and maintained in operative condition relatively inexpensively. Further, the valve structure of this invention can be operated either by a switch 118 on the housing or frame 10 or by the off-on switch of the machine with which the valve structure is used.

What is claimed is:

1. A valve structure for a suction system comprising: a frame, a conduit secured to said frame, said conduit having a peripheral valve seat therein, said conduit respectively having a high pressure portion and a low pressure portion on opposite sides of said valve seat, said valve seat having a face directed toward said high pressure portion, a valve mounted for swinging movement in said high pressure conduit portion, said valve being movable between a closed position in which said valve is peripherally engaged to said valve seat and an open position, an actuating shaft secured to said valve and mounted to said frame for rotation, a motor mounted to said frame, a motor-driven shaft operatively connected to said motor, a clutch operatively connected between said driven shaft and actuating shaft, first means operatively connected to said clutch for selectively engaging and disengaging said clutch, and second means operatively connected to said motor for selectively starting and stopping said motor.

2. The valve structure of claim 1 wherein said motor runs in a single direction and wherein said second means further comprises a normally closed switch operatively connected to said motor, switch-opening means connected to said actuating shaft for opening said switch when said valve is in said open position, said switch being electrically isolated from said first means, and brake means operatively connected to said motor for preventing said driven shaft from moving when said motor is not running, the engagement of said clutch while said brake means is operated holding said valve in said open position.

3. The valve structure of claim 1 wherein said frame has a closed chamber adjacent to said conduit, said chamber being separated from said conduit by a dust-tight partition, said actuating shaft passing through said partition and extending on both sides thereof, said motor, clutch and first and second means being in said chamber.

4. The valve structure of claim 1 further comprising a time delay means operatively connected in series with said first means for delaying the disengagement of said clutch after said first means has been so actuated.

5. The valve structure of claim 1 wherein said clutch comprises a fixed clutch portion and a movable clutch portion, said fixed portion being secured to said driven shaft, said movable clutch portion being positioned on said actuating shaft, said driven and actuating shafts being positioned on the same axis in spaced apart relation, said clutch portions being coaxial of the respective shafts, said movable clutch portion being slideable axially on said actuating shaft between a first position in which said movable clutch portion is engaged with said stationary clutch portion and a second position in which said clutch portions are spaced apart and disengaged, said first means being connected to said movable clutch portion, and means associated with said actuating shaft for preventing said movable clutch portion from rotating about said axis independently of said actuating shaft whereby the rotary motion of said driven shaft is imparted to said actuating shaft when said clutch portions are engaged.

6. A valve structure for a suction system comprising: a frame and a conduit secured to said frame, said frame having a closed chamber adjacent to said conduit, said chamber being separated from said conduit by a dust-tight partition, said conduit having a peripheral valve seat therein, said conduit respectively having a high pressure portion and a low pressure portion on opposite sides of said valve seat, said valve seat having a face directed toward said high pressure portion, a valve mounted for swinging movement in said high pressure conduit portion, said valve being movable between a closed position in which said valve is peripherally engaged to said valve seat and an open position, an actuating shaft secured to said valve and mounted to said frame for rotation, a motor mounted to said frame, said motor running in a single direction, said actuating shaft passing through said partition and extending on both sides thereof, a motor-driven shaft operatively connected to said motor, a clutch operatively connected between said driven shaft and actuating shaft, said clutch comprising a fixed clutch portion and a movable clutch portion, said fixed portion being secured to said driven shaft, said movable clutch portion being positioned on said actuating shaft, said driven and actuating shafts being positioned on the same axis in spaced apart relation, said clutch portions being coaxial of the respective shafts, said movable clutch portion being slideable axially on said actuating shaft between a first position in which said movable clutch portion is engaged with said stationary clutch portion and a second position in which said clutch portions are spaced apart and disengaged, first means connected to said movable clutch portion for selectively engaging and disengaging said clutch, means associated with said actuating shaft for preventing said movable clutch portion from rotating about said axis independently of said actuating shaft whereby the rotary motion of said driven shaft is imparted to said actuating shaft when said clutch portions are engaged, a normally closed switch operatively connected to said motor, switch-opening means connected to said actuating shaft for opening said switch when said valve is in said open position, said switch being electrically isolated from said first means, and brake means operatively connected to said motor for preventing said driven shaft from moving when said motor is not running, the engagement of said clutch while said brake means is operated holding said valve in said open position, a time delay means operatively connected in series with said first means for delaying the disengagement of said clutch after said first means has been so actuated.

(References on following page)

References Cited

UNITED STATES PATENTS

| | | | |
|---|---|---|---|
| 2,203,233 | 6/1940 | Panish | 251—134 |
| 2,611,577 | 9/1952 | Grant | 251—138 |
| 3,165,291 | 1/1965 | Osen | 251—134 |
| 3,334,859 | 8/1967 | Raymond | 251—134 |

HENRY T. KLINKSIEK, Primary Examiner

U.S. Cl. X.R.

144—2; 251—298